(12) United States Patent
Akiba (10) Patent No.: US 6,765,332 B2
(45) Date of Patent: Jul. 20, 2004

(54) ELECTROSTATIC ACTUATOR AND CAMERA MODULE

(75) Inventor: Toshikatsu Akiba, Kisarazu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/327,907

(22) Filed: Dec. 26, 2002

(65) Prior Publication Data

US 2003/0122447 A1 Jul. 3, 2003

(30) Foreign Application Priority Data

Dec. 28, 2001 (JP) .......................................... 2001-402001

(51) Int. Cl.$^7$ ............................................... H02N 1/00
(52) U.S. Cl. .......................... 310/309; 396/75; 396/133; 29/DIG. 1; 29/746; 359/823
(58) Field of Search ....................... 310/309; 29/DIG. 1, 29/729, 734, 746; 359/823, 824; 396/75, 133, 439, 661

(56) References Cited

U.S. PATENT DOCUMENTS

| | | | | |
|---|---|---|---|---|
| 3,609,218 | A | * | 9/1971 | Herb .......................... 174/141 |
| 6,611,079 | B2 | * | 8/2003 | Koga et al. .................. 310/309 |
| 2001/0028203 | A1 | * | 10/2001 | Kasahara et al. ........... 310/309 |
| 2002/0036443 | A1 | * | 3/2002 | Akiba et al. ................. 310/309 |
| 2002/0050764 | A1 | * | 5/2002 | Koga et al. .................. 310/309 |
| 2003/0057802 | A1 | * | 3/2003 | Koga et al. .................. 310/309 |

FOREIGN PATENT DOCUMENTS

| JP | 2001232794 | * | 8/2001 | ............ B41J/2/045 |
|---|---|---|---|---|
| JP | 2001-268946 | | 9/2001 | ............ H02N/1/00 |
| JP | 2001-346385 | | 12/2001 | ............ H02N/1/00 |

OTHER PUBLICATIONS

Akihiro Koga, et al., "Electrostatic Linear Microactuator Mechanism For Focusing a CCD Camera", Journal of Light Wave Technology by IEEE, vol. 17, No. 1, Jan. 1999, pp. 43–47.

U.S. patent application Ser. No. 10/327,907, Akiba et al., filed Dec. 26, 2002.

U.S. patent application Ser. No. 10/672,434, Koga et al., filed Sep. 29, 2003.

U.S. patent application Ser. No. 09/963,424, filed Sep. 27, 2001.

U.S. patent application Ser. No. 10/243,677, filed Sep. 16, 2002, pending.

* cited by examiner

*Primary Examiner*—Karl Tamai
(74) *Attorney, Agent, or Firm*—Oblon, Spivak, McClelland, Maier & Neustadt, P.C.

(57) ABSTRACT

A stationary element is provided with side members and electrode plates. The side surfaces of one electrode plate are brought into contact with inner walls surfaces of the side members. In addition, the electrode surface 61 of the other electrode plate is brought into contact with the side surfaces of the side members. One of the electrode plates is adhered to the side members by applying an adhesive to the side surfaces of the electrode plate and the side surfaces of the side members. The other electrode plate is adhered to the side members by applying an adhesive to the side surfaces of the electrode plate and the side surfaces of the side members.

12 Claims, 5 Drawing Sheets

ELECTROSTATIC ACTUATOR AND CAMERA MODULE

CROSS-REFERENCE TO RELATED APPLICATIONS

This application is based upon and claims the benefit of priority from the prior Japanese Patent Application No. 2001-402001, filed on Dec. 28, 2001, the entire contents of which are incorporated herein by reference.

BACKGROUND OF THE INVENTION

1. Field of the Invention

The present invention relates to an electrostatic actuator and a camera module which are driven by an electrostatic force, more specifically to those capable of maintaining actuator performance without reference to temperature variations.

2. Description of the Related Art

An electrostatic actuator includes a movable element, and a substantially-rectangular stationary element that defines a space extending in a predetermined direction and allowing the movable element to move therethrough. The gap between the movable element and the stationary element is of the order of several microns. The movable element has a pair of surfaces that face the inner walls of the stationary element, and a convex stripe electrode is formed on each of those surfaces, thereby forming electrode surfaces. The stationary element has electrode plates on which electrodes are formed. The electrodes are formed at positions facing the electrode surfaces of the movable element. In the electrostatic actuator having this structure, the movable element is electrostatically driven when the electrodes of the stationary element are applied with voltage in a predetermined order.

The stationary element of the electrostatic actuator is formed by disposing the electrode plates in a mold and then inserting resin or the like into the mold. The movable element is formed likewise. This formation method is generally used since it is advantageous in terms of the manufacturing cost and suitable for mass production.

An electrostatic actuator whose movable element and stationary element are formed in the above resin-insertion method has the following problems. In order for the electrostatic actuator to attain its desired driving power, the gap between the movable element and the stationary element must be determined and maintained with high precision. When the resin-insertion method is used, however, the dimensions of movable elements and stationary elements vary greatly, so that high precision is hard to attain. This gives rise to variations in the actuator performance. Furthermore, the wiring portions of the electrode plates are exposed to high pressure and high temperature at the time of resin insertion. Since the wiring portions are likely to break, the manufacturing yield may deteriorate.

BRIEF SUMMARY OF THE INVENTION

An object of the present invention is to provide an electrostatic actuator and a camera module which are formed with high precision and can therefore ensure desired actuator performance.

To solve the above problems and achieve the object, an electrostatic actuator according to the first aspect of the present invention comprises: a stationary element; and a movable element which is reciprocated in a predetermined direction while being guided by the stationary element and which is provided with a pair of opposing surfaces having electrodes thereon. The stationary element comprises: a pair of side members that face each other, with the moving space of the movable element being located therebetween; and a pair of electrode plates which face each other, with the moving space of the movable element being located therebetween, and on which electrodes are arranged in such a manner as to oppose the electrodes of the movable element. One of the paired electrode plates has side surfaces that are in partial contact with inner walls of the side members opposing the movable element. The other one of the paired electrode plates is disposed in such a manner that its electrode surface is in partial contact with the side surfaces of the paired side members. The one of the paired electrode plates and the side surfaces of the side members are coupled together by use of an adhesive that is applied to the side surface of the one of the paired electrode plate and to the side surfaces of the side members. The other one of the paired electrode plates and the side members are coupled together by use of an adhesive that is applied to the side surface of the other one of the paired electrode plates and the side surfaces of the side members.

An electrostatic actuator according to the second aspect of the present invention comprises: a stationary element; and a movable element which is reciprocated in a predetermined direction while being guided by the stationary element and which is provided with a pair of opposing surfaces having electrodes thereon. The stationary element comprises: a pair of side members that face each other, with the moving space of the movable element being located therebetween; and a pair of electrode plates which face each other, with the moving space of the movable element being located therebetween, and on which electrodes are arranged in such a manner as to oppose the electrodes of the movable element. The paired electrode plates have side surfaces that are in partial contact with inner walls of the side members. The paired electrode plates and the paired side members are coupled together by use of an adhesive that is applied to the side surfaces of the paired electrode plates and to the side surfaces of the side members.

An electrostatic actuator according to the third aspect of the present invention comprises: a stationary element; and a movable element which is reciprocated in a predetermined direction while being guided by the stationary element and which is provided with a pair of opposing surfaces having electrodes thereon. The stationary element comprises: a pair of side members that face each other, with the moving space of the movable element being located therebetween; and a pair of electrode plates which face each other, with the moving space of the movable element being located therebetween, and on which electrodes are arranged in such a manner as to oppose the electrodes of the movable element. The paired electrode plates have side surfaces that are in contact with inner walls of the side members. The paired electrode plates and the paired side members are coupled together by use of an adhesive that is applied to the electrode surface of one of the paired electrode plates and to inner side surfaces of the paired side members and by use of an adhesive that is applied to the reverse surface of the other one of the paired electrode plates and to the inner wall surfaces of the paired side members.

DETAILED DESCRIPTION OF THE INVENTION

Figure 1A:
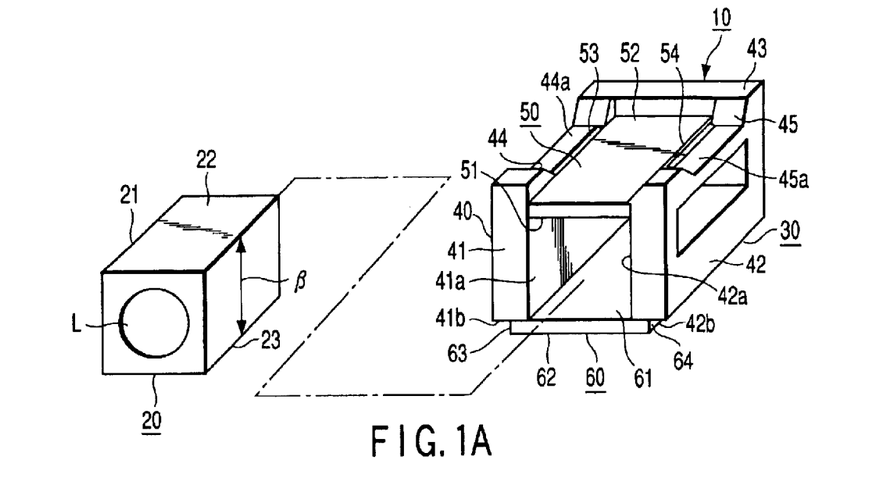
FIGS. 1A–1C show an electrostatic actuator according to the first embodiment of the present invention.
Figure 1B:
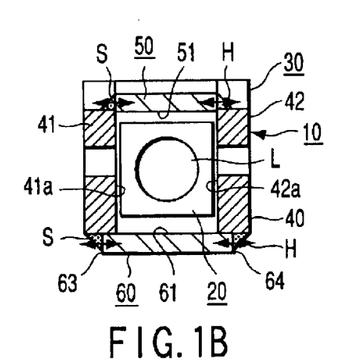
Figure 1C:
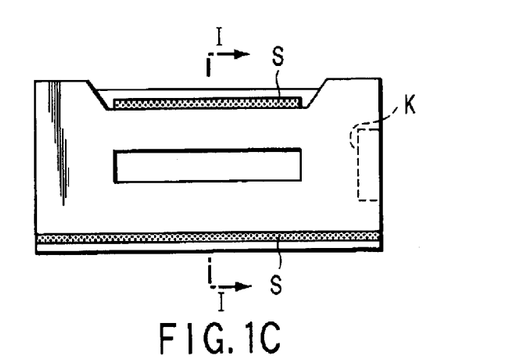
Figure 2A:
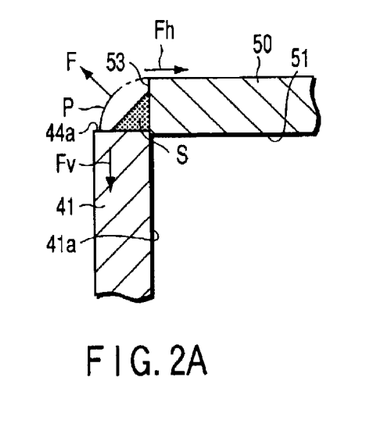
FIGS. 2A–2B are explanatory diagrams showing the major portion of the electrostatic actuator.
Figure 2B:
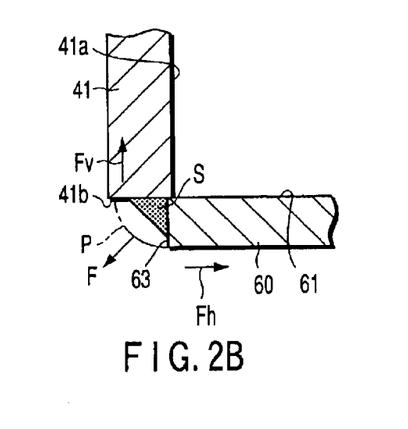
Figure 3:
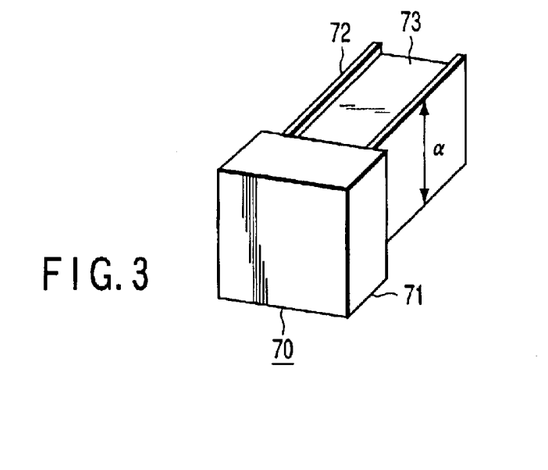
FIG. 3 is a dimensional-reference jig used for manufacturing the electrostatic actuator.

FIGS. 1A–1C show an electrostatic actuator 10 according to the first embodiment of the present invention. FIG. 1A is a perspective view, FIG. 1B is a sectional view taken along line I—I in FIG. 1C and showing how the electrostatic actuator looks like when viewed in the direction indicated by the arrows in FIG. 1C, and FIG. 1C is a side view. FIGS. 2A and 2B are magnified illustrations showing how a stationary-element frame 40 and electrode plates 50 and 60 are adhered to each other. FIG. 3 is a perspective view of a dimensional-reference jig 70. In the Figures, "L" denotes a lens and "K" denotes an imaging element.

As shown in FIGS. 1A–1C, the electrostatic actuator 10 comprises a movable element 20 and a stationary element 30. The movable element 20 is a substantially rectangular parallelepiped and has a hollow section. The electrostatic actuator 10 serves as a camera module and is incorporated in a small-sized electronic device.

The movable element 20 includes a main body 21 which is a substantially rectangular parallelepiped and configured to hold lens L. The main body 21 has a pair of electrode surfaces 22 and 23 which face electrode plates 50 and 60 (to be mentioned later) of the stationary element 30. Convex stripe electrodes are formed on the electrode surfaces 22 and 23. The movable element 20 is formed with high precision.

The stationary element 30 includes a frame 40, and electrode plates 50 and 60 facing the electrode surfaces 22 and 23 described above. The frame 40 is made up of side members 41 and 42, which face each other, and a back member 43. The side members 41 and 42 have cutout sections 44 and 45, and support surfaces 44a and 45a are exposed. The back member 43 is configured to hold an imaging element K on which images are formed by lens L. The electrode plates 50 and 60 have electrode surfaces 51 and 61 facing the movable element 20. Stripe electrodes are formed on the electrode surfaces 51 and 61. In FIGS. 1A and 1B, reference numerals 52 and 62 denote the reverse surfaces of the electrode surfaces 51 and 61, and no electrode is formed on those reverse surfaces.

A description will now be given of how the electrostatic actuator 10 of the above structure is assembled. FIG. 3 shows a dimensional-reference jig 70 used for assembly. The dimensional-reference jig 70 comprises a base member 71 to be brought into contact with the frame 40 of the stationary element 30, and an insertion section 72 to be inserted. The insertion section 72 has a concave section 73. The dimension α between the top and bottom surfaces of the insertion section 72 is slightly greater than the dimension β between the top and bottom surfaces of the movable element 20.

First of all, the dimensional-reference jig 70 is brought into contact with a predetermined position on the frame 40 of the stationary element 30. Then, the side surfaces 53 and 54 of the electrode plate 50 are brought into contact with the inner wall surfaces 41a and 42a of the side members 41 and 42, the frame constituting a coupling member coupling the side members 41 and 42 together. In this state, adhesive S is applied to the region between the support surfaces 44a and 45a of the frame 40 and the side surfaces 53 and 54 of the plate 50, and is left to set. Then, the dimensional-reference jig 70 is reversed, and the electrode plate 60 is brought into contact with the insertion section 72 of the dimensional-reference jig 70. Further, the electrode surface 61 of the electrode plate 60 is brought into contact with the side surfaces 41b and 42b of the side members 41 and 42. In this state, adhesive S is applied to the region between the side surfaces 41b and 42b of the frame 40 and the side surfaces of the electrode plate 60, and is left to set.

Thereafter, the insertion section 72 is pulled out. Since the concave section 73 is formed, the electrodes do not contact the insertion section 72 then. Hence, damage to the electrodes is prevented.

In the electrostatic actuator 10 described above, the movable element 20 is inserted into the stationary element 30, and the movable element 20 is electrostatically driven by applying a voltage to the electrodes on the electrode plates 50 and 60 in a predetermined order. The insertion section 72 is larger than the movable element 20 by the dimension of the gap. Therefore, when the movable element 20 is inserted, gaps of predetermined dimensions are defined between the movable element 20 and the electrode plates 50 and 60. To be more specific, the gaps between the electrode surfaces 22 and 23 of the movable element 20 and the electrodes of the electrode plates 50 and 60 are of a design value, which is of the order of several microns.

A description will now be given as to how the electrostatic actuator 10 behaves in response to temperature variations. At high temperature, adhesive S expands in the direction of arrow F, as indicated by "P" in FIGS. 2A and 2B. Because of the expansion of the adhesive S, forces are exerted in the directions of arrows Fh and Fv. At low temperature, forces are exerted in the opposite directions. Therefore, the electrode plates 50 and 60 expand or contract in the directions of arrow H of FIG. 1B in accordance with temperature variations. Since the gaps hardly vary, the effect the temperature variation may have on the driving force can be minimized. It should be noted that the electrode plates 50 and 60 are supported on both sides by the frame 40. The electrode plates 50 and 60 may warp slightly when they expand or contract, but the variations the gaps may undergo when the electrode plates 50 and 60 warp are so small that the driving force remains substantially unchanged.

Since the electrostatic actuator of the first embodiment is assembled in the manner described above, the electrode plates 50 and 60 can be positioned with high accuracy. Since, therefore, the stationary element 30 need not be worked with high precision, the electrostatic actuator can be manufactured easily.

In addition, the adhesive S used for connecting the electrode plates 50 and 60 to the frame 40 is applied to such a position as minimizes the effect the thermal deformation may have on the dimensions of the gaps. Thanks to this feature, the actuator can exhibit its desired performance in a wide temperature range.

Figure 4A:
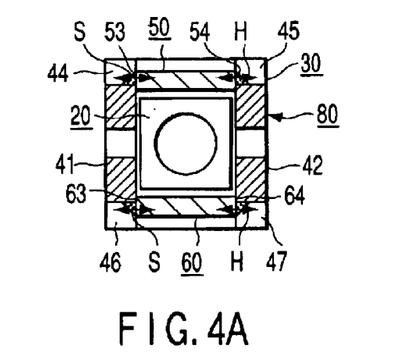
FIGS. 4A and 4B show an electrostatic actuator according to the second embodiment of the present invention.
Figure 4B:
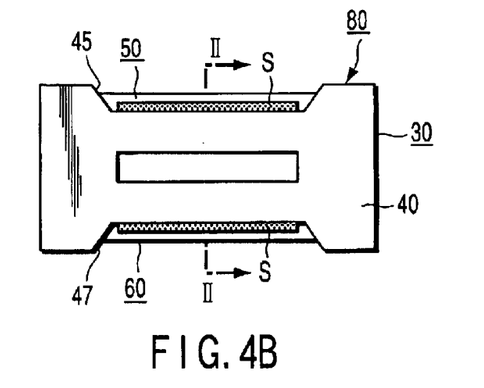

FIGS. 4A and 4B show an electrostatic actuator 80 according to the second embodiment of the present invention. FIG. 4A is a sectional view taken along line II—II of FIG. 4B and showing how the actuator looks like when viewed in the direction of the arrows. FIG. 4B is a side view. In FIGS. 4A and 4B, the same reference numerals as used in FIGS. 1A–1C denote similar or corresponding structural elements, and a detailed description of such structural elements will be omitted.

The electrostatic actuator of the second embodiment differs from that of the first embodiment in that cutout sections 47 and 47 are provided also in the bottom surfaces of side members 41 and 42. Support surfaces 46a and 47a are exposed.

The electrostatic actuator 80 of the second embodiment is assembled by use of a dimensional-reference jig 70 in a similar way to that of the electrostatic actuator 10 of the first embodiment. At the time of assembly, the side surfaces 63 and 64 of an electrode plate 60 are brought into contact with the inner wall surfaces 41a and 42a of the side members 41 and 42. In this state, adhesive S is applied to the region between the support surfaces 46a and 47a of a frame 40 and the side surfaces 63 and 64 of the plate 60, and is left to set.

The electrostatic actuator 80 of the second embodiment has a similar feature to that of first embodiment. That is, the electrode plates 50 and 60 extend or contract in the direction of arrow H when the adhesive S expands or contracts in response to temperature variations. Hence, the effect the temperature variation may have on the gap dimensions can be minimized. It should be noted that the electrode plates 50 and 60 may be the same in shape, which increases the productivity.

Figure 5A:
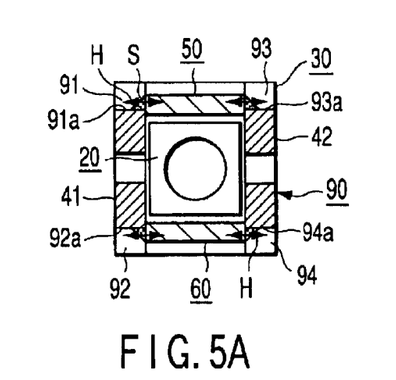
FIGS. 5A and 5B show an electrostatic actuator according to the third embodiment of the present invention.
Figure 5B:
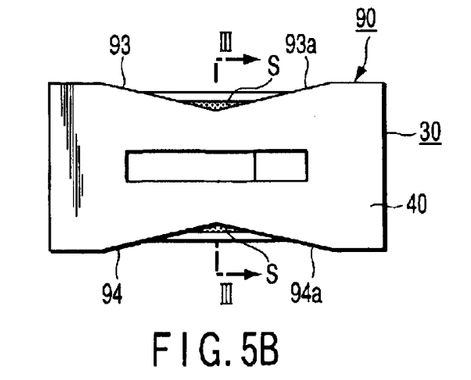

FIGS. 5A and 5B show an electrostatic actuator 90 according to the third embodiment of the present invention. FIG. 5A is a sectional view taken along line III—III of FIG. 5B and showing how the actuator looks like when viewed in the direction of the arrows. FIG. 5B is a side view. In FIGS. 5A and 5B, the same reference numerals as used in FIGS. 4A and 4B denote similar or corresponding structural elements, and a detailed description of such structural elements will be omitted.

One (41) of the side members of the stationary-element frame 40 of the electrostatic actuator 90 has conical cutout sections 91 and 92, and support surfaces 91a and 92a are exposed. Likewise, the other side member 42 has conical cutout sections 93 and 94, and support surfaces 93a and 94a are exposed.

Like the actuator 10 of the first embodiment, the actuator 90 of the third embodiment is assembled by use of a dimensional-reference jig 70. At the time of assembly, adhesive S is applied to the region between the support surfaces 91a and 93a of the frame 40 and the side surfaces 53 and 54 of the plate 50, and to the region between the support surfaces 92a and 94a and the side surfaces 63 and 64 of the plate 60. The adhesive, thus applied, is left to set.

The electrostatic actuator 90 of the third embodiment is similar to the actuators of the foregoing embodiments in that the electrode plates 50 and 60 extend or contract in the direction of arrow H when the adhesive S expands or contracts in response to temperature variations. Hence, the effect the temperature variation may have on the gap dimensions can be minimized. Furthermore, the amount of adhesive S required can be reduced.

Figure 6A:
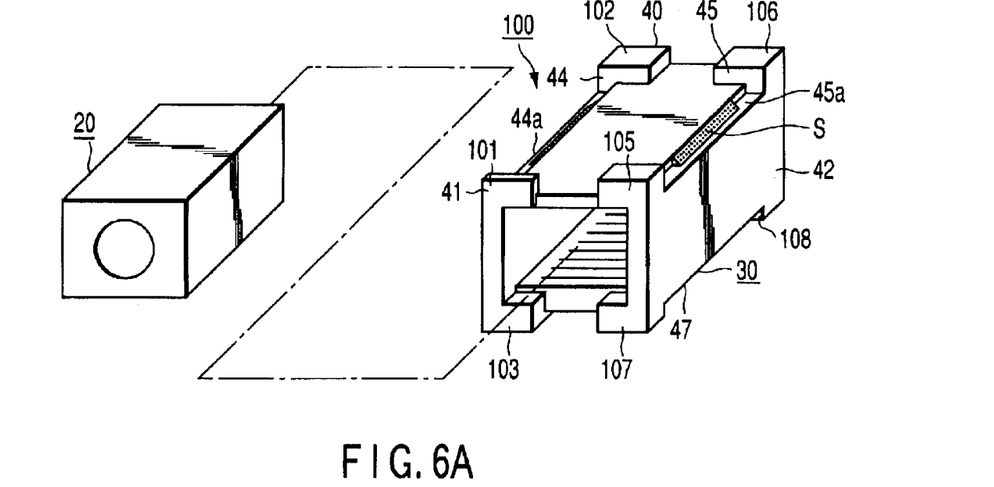
FIGS. 6A–6C show an electrostatic actuator according to the fourth embodiment of the present invention.
Figure 6B:
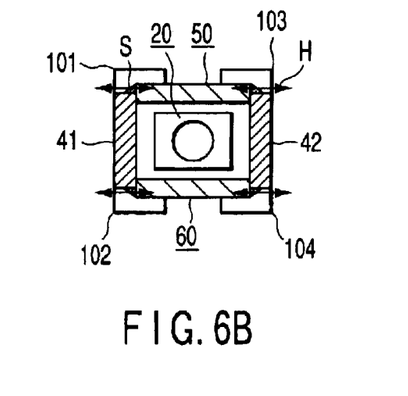
Figure 6C:
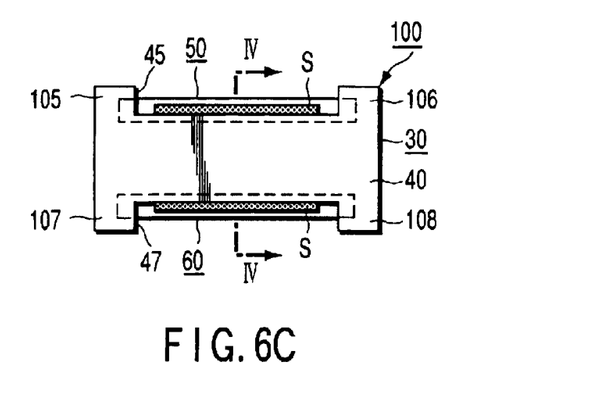

FIGS. 6A–6C show an electrostatic actuator 100 according to the fourth embodiment of the present invention. FIG. 6A is a perspective view, FIG. 6B is a sectional view taken along line IV—IV in FIG. 6C and showing how the electrostatic actuator looks like when viewed in the direction indicated by the arrows in FIG. 6C, and FIG. 6C is a side view. In FIGS. 6A–6C, the same reference numerals as used in FIGS. 4A and 4B denote similar or corresponding structural elements, and a detailed description of such structural elements will be omitted.

The stationary-element frame 40 of the electrostatic actuator 100 of the fourth embodiment does not comprise a back member. Instead, side member 41 of the frame 40 comprises engagement portions 101–104, and side member 42 comprises engagement portions 105–108.

Like the actuator 10 of the first embodiment, the actuator 100 of the fourth embodiment is assembled by use of a dimensional-reference jig 70. At the time of assembly, adhesive S is applied to the region between the support surfaces 44a and 45a of the frame 40 and the side surfaces 53 and 54 of the electrode plate 50, and to the region between the support surfaces 46a and 47a and the side surfaces 63 and 64 of the electrode plate 60. The adhesive, thus applied, is left to set.

The electrostatic actuator 100 of the fourth embodiment is similar to the actuators of the foregoing embodiments in that the electrode plates 50 and 60 extend or contract in the direction of arrow H when the adhesive S expands or contracts in response to temperature variations. Hence, the effect the temperature variation may have on the gap dimensions can be minimized. Furthermore, the engagement portions 101-108 serve to restrict movement of the electrode plates 50 and 60 in the moving direction of the movable element 20. This enables highly-precise positioning.

Figure 7A:
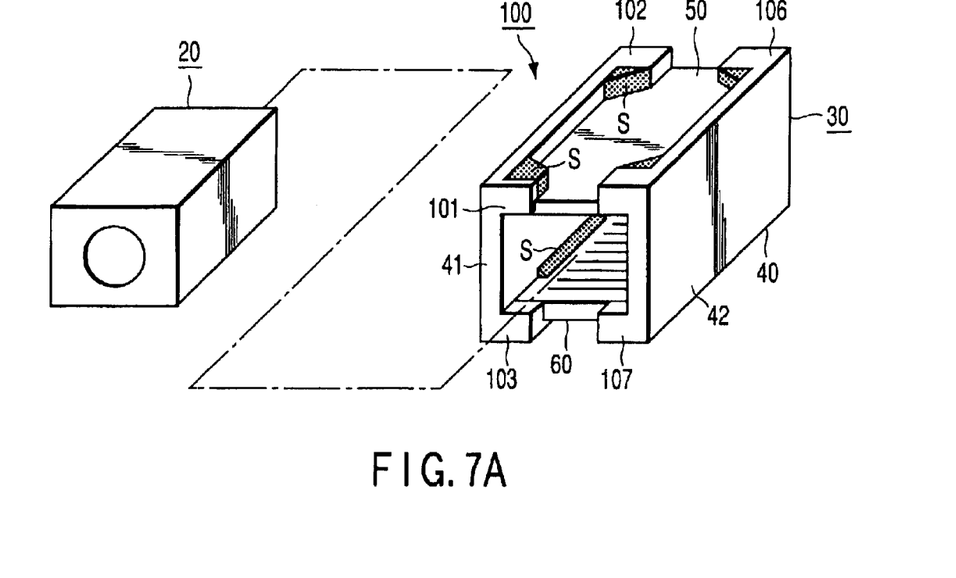
FIGS. 7A–7C show an electrostatic actuator according to the fifth embodiment of the present invention.
Figure 7B:
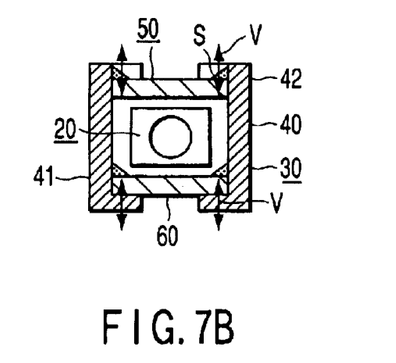
Figure 7C:
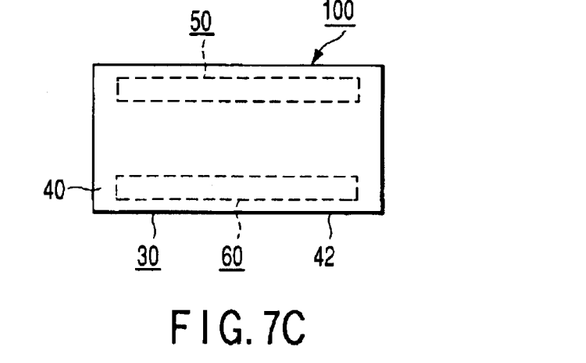
Figure 8:
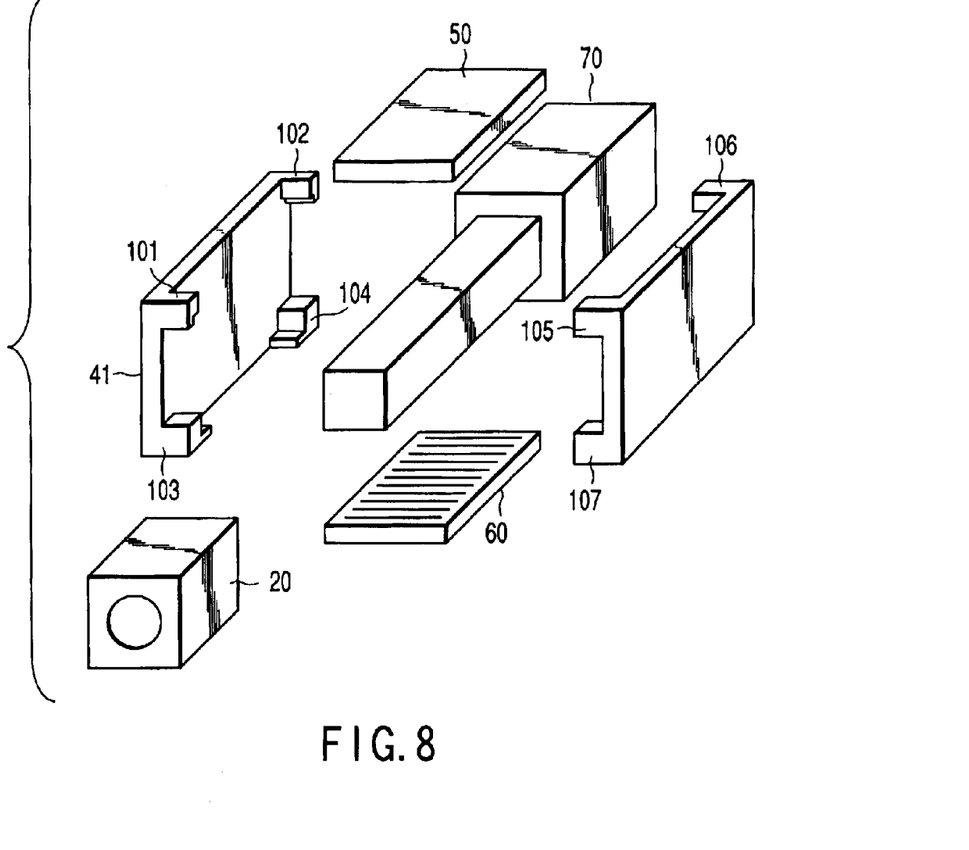
FIG. 8 is an exploded perspective view showing the electrostatic actuator and the dimensional-reference jig.

FIGS. 7A–7C show an electrostatic actuator 110 according to the fifth embodiment of the present invention. In FIGS. 7A–7C, the same reference numerals as used in FIGS. 6A–6C denote similar or corresponding structural elements, and a detailed description of such structural elements will be omitted.

When the electrostatic actuator 110 of the fifth embodiment is manufactured, electrode plates 50 and 60 are positioned with accuracy, using the dimensional-reference jig 70. The side surfaces 53 and 54 of electrode plate 50 are brought into contact with the inner wall surfaces 41a and 42a of the side members 41 and 42. In this state, adhesive S is applied to the region between the inner wall surfaces 41a and 42a of the stationary-element frame 40 and the reverse surface 52 of the plate 50, and is left to set. Likewise, the side surfaces 63 and 64 of electrode plate 60 are brought into contact with the inner wall surfaces 41a and 42a of the side members 41 and 42. In this state, adhesive S is applied to the region between the inner wall surfaces 41a and 42a of the side members 41 and 42 and the electrode surface 61 of the plate 60, and is left to set.

Figure 9:
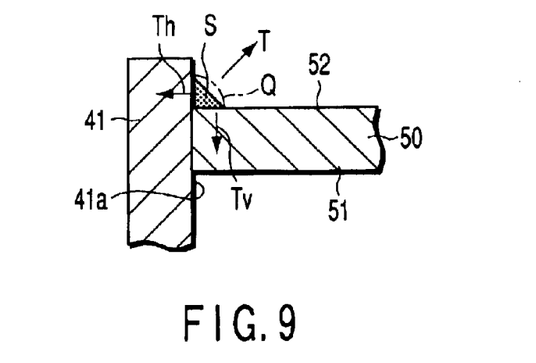
FIG. 9 is an explanatory diagram showing the major portion of the electrostatic actuator.

The electrostatic actuator 110 of the fifth embodiment is featured in that at high temperature, the adhesive S expands in the manner indicated by the one-dot-dash line Q of FIG. 9 and a force is exerted in the direction of arrow T. As a result, horizontal force Th and downward force Tv are generated. Force Tv warps not only electrode plate 50 but also electrode plate 60. Since the electrode plates 50 and 60 are transformed substantially in the same direction and to the same extent, the gaps between them and the movable element 20 remain unchanged. Hence, the effect the temperature variation may have on the gap dimensions can be minimized when the adhesive S expands or contracts.

The present invention is not limited to the embodiments described above, and can be modified in various manners without departing from the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A electrostatic actuator comprising:

a stationary element which includes a first side member an a second side member which face each other, each side member having a first side surface, a second side surface and an inner wall, a first electrode plate and a second electrode plate which face each other, each electrode plate having a pair of third side surfaces, and an electrode surface including an electrode arranged thereon; and a movable element which is reciprocated in a predetermined direction while being guided by the stationary element and which is provided with a pair of opposing surfaces having electrodes thereon, wherein the pair of third side surfaces of the first electrode plate are in partial contact with the inner walls of the first and second side members opposing the movable element, the electrode surface of the second electrode plate is in partial contact with the second side surfaces of the first and second side members opposing the movable element, the first electrode plate and the first and second side members are coupled together by use of an adhesive that is applied to the pair of third side surfaces of the first electrode plate and the first side surfaces of the first and second side members, and the second electrode plate and the first and second side members are coupled together by use of an adhesive that is applied to the pair of third side surfaces of the second electrode plate and the second side surfaces of the first and second side members.

2. An electrostatic actuator according to claim 1, further comprising coupling member configured to couple the side members together.

3. A camera module comprising:

an imaging element; and at least one lens configured to form an image on the imaging element, at least one of the at least one lens being held by the electrostatic actuator recited in claim 2.

4. A camera module comprising:

an imaging element; and at least one lens configured to form an image on the imaging element, at least one of the at least one lens being held by the electrostatic actuator recited in claim 1.

5. An electrostatic actuator comprising:

a stationary element which includes a first side member an a second side member which face each other, each side member having a first side surface, a second side surface and an inner wall, a first electrode plate and a second electrode plate which face each other, each electrode plate having a pair of third side surfaces, and an electrode surface including an electrode arranged thereon; and a movable element which is reciprocated in a predetermined direction while being guided by the stationary element and which is provided with a pair of opposing surfaces having electrodes thereon, wherein the pair of third side surfaces of the first electrode plate are in partial contact with the inner walls of the first and second side members opposing the movable element, the pair of third side surfaces of the second electrode plate are in partial contact with the inner walls of the first and second side members opposing the movable element, the first electrode plate and the first and second side members are coupled together by use of an adhesive that is applied to the pair of third side surfaces of the first electrode plate and the first side surfaces of the first and second side members, and the second electrode plate and the first and second side members are coupled together by use of an adhesive that is applied to the pair of third side surfaces of the second electrode plate and the second side surface of the first and second side members.

6. An electrostatic actuator according to claim 5, further comprising coupling member configured to couple the side members together.

7. A camera module comprising:

an imaging element; and at least one lens configured to form an image on the imaging element, at least one of the at least one lens being held by the electrostatic actuator recited in claim 6.

8. A camera module comprising:

an imaging element; and at least one lens configured to form an image on the imaging element, at least one of the at least one lens being held by the electrostatic actuator recited in claim 5.

9. An electrostatic actuator comprising:

a stationary element which includes a first side member and a second side member which face each other, each side member having a first side surface, a second side surface and an inner wall, a first electrode plate and a second electrode plate which face each other, each electrode plate having a pair of third side surfaces, and an electrode surface including an electrode arranged thereon; and a movable element which is reciprocated in a predetermined direction while being guided by the stationary element and which is provided with a pair of opposing surfaces having electrodes thereon, wherein the pair of third side surfaces of the first electrode plate are in contact with the inner walls of the first and the second side members opposing the movable element, the pair of third side surfaces of the second electrode plate are in contact with the inner walls of the first and second side members opposing the movable element, the first electrode plate and the first and second side members are coupled together by use of an adhesive that is applied to the pair of third side surfaces of the first electrode plate and the inner walls of the first and second side members, and the second electrode plate and the first and second side members are coupled together by use of an adhesive that is applied to the pair of third side surfaces of the second electrode plate and the inner walls of the first and second side members.

10. An electrostatic actuator according to claim 9, further comprising coupling member configured to couple the side members together.

11. A camera module comprising:
an imaging element; and
at least one lens configured to form an image on the imaging element,
at least one of the at least one lens being held by the electrostatic actuator recited in claim 10.

12. A camera module comprising:
an imaging element; and
at least one lens configured to form an image on the imaging element,
at least one of the at least one lens being held by the electrostatic actuator recited in claim 9.

* * * * *